INVENTOR.
Jerome H. Lemelson

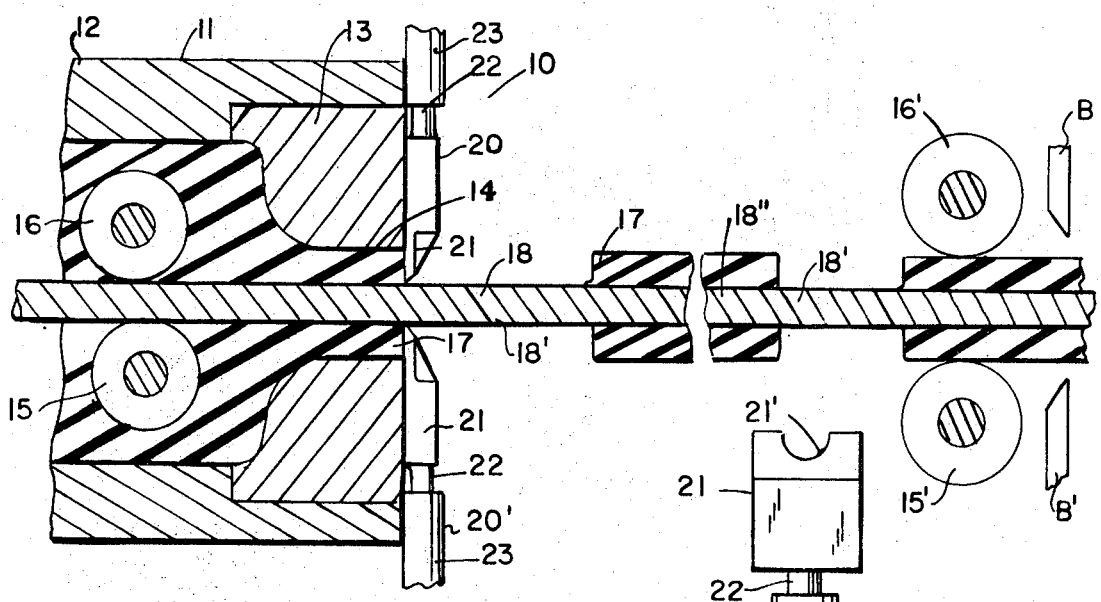

INVENTOR.
Jerome H. Lemelson

United States Patent Office 3,557,403
Patented Jan. 26, 1971

3,557,403
COMPOSITE EXTRUSION APPARATUS AND METHOD
Jerome H. Lemelson, 85 Rector St.,
Metuchen, N.J. 08840
Continuation-in-part of application Ser. No. 142,405,
Oct. 2, 1961. This application Jan. 21, 1969, Ser.
No. 792,477
Int. Cl. B29d 23/05; B29f 3/10
U.S. Cl. 18—13                                                14 Claims

ABSTRACT OF THE DISCLOSURE

An apparatus and method for producing novel composite extrusions are provided as are the extrusions produced thereby. The apparatus includes means for feeding an elongated member such as a metal wire, wire rope, electrical cable or other device through the throat of an extrusion die and extruding in situ thereon an extrusion material such as a rigid or flexible polymer. Means are provided for variably operating one or more tools to vary the opening in the extrusion die so as to vary the cross section of extrusion material formed in situ on the elongated member fed through the die. In one form, electrically insulating material is extruded in situ on an electrical conductor such as a wire, strip of metal or series of these elements to form a protective insulating sheathing therein and tooling is provided to vary the thickness of the extrusion material along predetermined portions of the length of the composite article. For example, the tooling may be operative to either completely stop the flow of insulating material or substantially reduce same along predetermined portions of the length of the elongated member to either bare said sections of insulating material or provide such little insulating material thereon that the post-operative requirements for stripping insulating material in order to connect the ends of the electrical conductor to termnials or further conducting elements, will be eliminated, if not greatly simplified. A further advantage to be derived is that the usual waste encountered in stripping or baring the ends of wires and cables will be eliminated, if not substantially eliminated.

In another form of the invention, an elongated member such as a finite section of wire, rod or tube is passed through an extrusion die and predeterminately coated on its outside surface with extrusion material by automatically controlling the flow of said extrusion material to occur only when the elongated member is passing through the die and to be immediately terminated upon removing the elongated member from the die.

RELATED APPLICATIONS

This is a continuation-in-part of copending application Ser. No. 142,405, filed Oct. 2, 1961, now Pat. No. 3,422,648 for Extrusion Apparatus and Articles Produced Therefrom, having as a parent application Ser. No. 691,622 filed Oct. 22, 1957, now Pat. No. 3,002,615, for Extrusion Apparatus.

SUMMARY OF THE INVENTION

This invention relates to an extrusion apparatus for forming composite extrusions such as elongated electrical cable assemblies, jacketed tubing, partially-coated extrusion, wires and rods and the like on an automatic basis. While it is known in the art to coat elongated members such as electrical wires, cable and other articles of manufacture with a polymer for the purpose of insulating same, the conventional procedure is to continuously coat same and perform one or more post operations on the extrusion material and/or the article coated therewith after the composite extrusion has been so formed.

However, many composite extrusions require one or more post operations such as stripping or baring portions of the extrusion to permit the connection of terminals or other devices thereto by welding, soldering or winding the core member or wire after the insulating material has been removed. These post operations are costly in that they require handling the wire or composite extrusion, the operation of hand or power-operated tools and, furthermore, they result in the loss of a substantial amount of insulating material as scrap. Accordingly, it is a primary object of the instant invention to provide a new and improved apparatus and method for fabricating elongated extrusions surrounding core members whereby the extrusions may be varied in cross section to simplify assembly or to provide a new and improved product;

Another object is to provide an extrusion apparatus and method for forming jacketed electrical wires, cables and the like with portions of the insulation removed to simplify electrical assembly of the wire portions thereof with other elements or wires;

Another object is to provide an apparatus and method for forming coated wires and cable assemblies of variable cross section so as to simplify post assembly and connection operations;

Another object is to provide an apparatus for forming coated wires, rods and tubing for use in structural assemblies whereby the coating is variably provided along the length of the core to eliminate one or more post forming operations;

Another object is to provide an apparatus and method for predeterminately coating finite lengths of wire, rod, tubing and the like;

Another object is to provide an apparatus and method for continuously forming tube or pipe by extrusion and continuously coating the inside surface of said tube or pipe immediately after it is formed to shape;

Another object is to provide an apparatus and method for continuously forming metal pipe and continuously coating the inside surface of said pipe with a protective material such as a polymer or other suitable material;

Another object is to provide an extrusion apparatus for continuously forming an extrusion such as a tube or pipe and continuously working the extrusion as or immediately after it is formed to change or improve its physical characteristics.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a side view with parts broken away for clarity of an extrusion apparatus for coating an elongated member such as a wire, or rod, with a sheathing or covering and varying the thickness of said covering along the length of the member so coated;

FIG. 2 is an end view of one of the tools utilized in the apparatus of FIG. 1;

FIG. 3 is a cross-sectional view of a portion of a modified form of coated member produced by means of the apparatus of FIG. 1;

FIG. 4 is a side view in partial cross section of another form of composite elongated member formed by means of apparatus of the type shown in FIG. 1;

FIG. 5 is a side view in partial cross section of yet another form of elongated member formed by means of the apparatus of FIG. 1;

Figure 9:
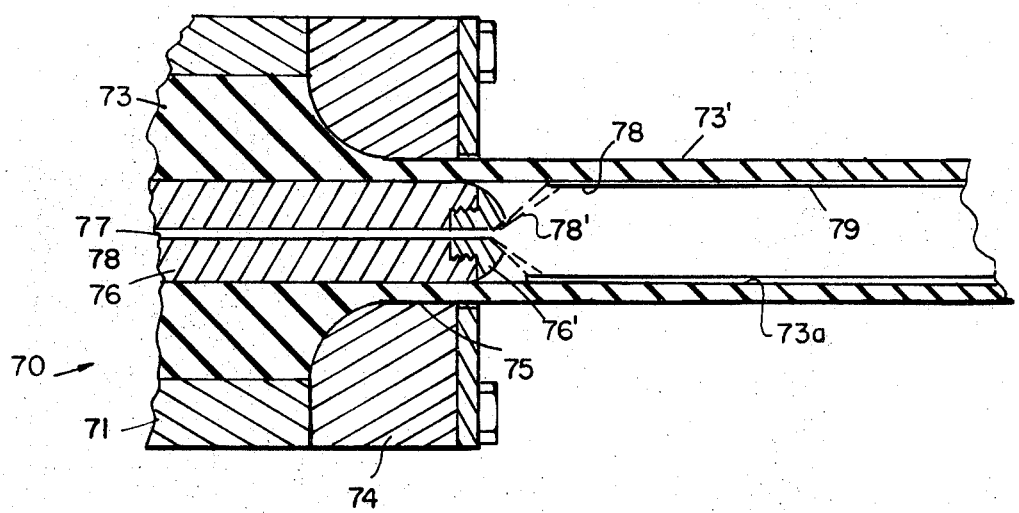
Figure 10:
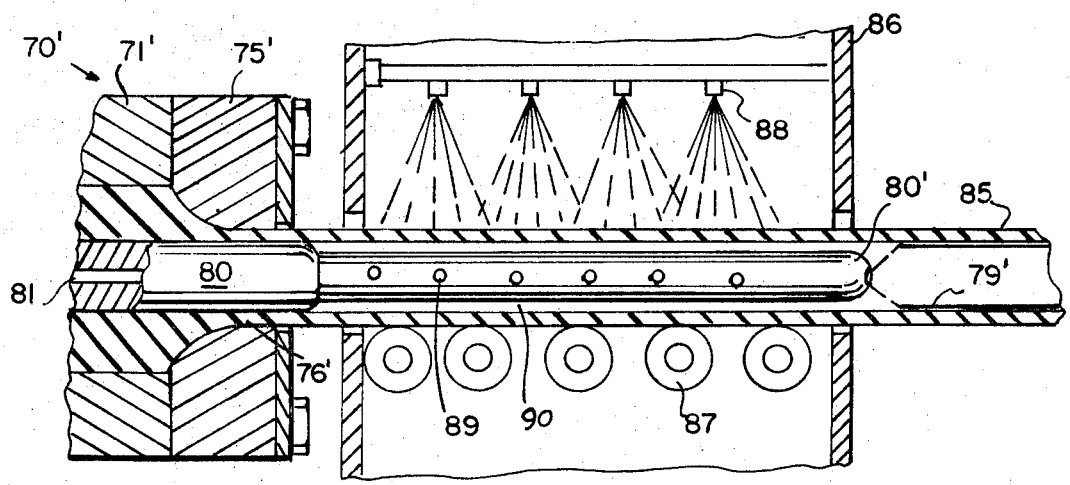

FIG. 9 is a partial side view taken in cross section of an extrusion apparatus forming an elongated tube and operative to simultaneously coat the inside surface of said tube with a material other than that employed for the extrusion of the tube; and FIG. 10 is a side view in partial cross section of a modified form of the apparatus of FIG. 9 providing for means for cooling the extruded tube prior to coating same.

FIG. 1 illustrates details of an apparatus 10 for extrusion-coating material on elongated members such as metal rods, wires, cable, strip or tubing with a protective material such as a plastic polymer and for providing portions of the members so coated which are either void of the coating material or contain a substantially reduced thickness of said coating material such that either a new and improved article may be derived therefrom or the core member may be more easily fastened or electrically connected to another member or terminal. If the apparatus of FIG. 1 is operative to prevent the formation of jacketing or coating material along selected portions of the length of an electrical wire or group of wires, then the post operations generally required to strip or bare the ends of said wire or wires to effect their electrical connection to other wires or electrical devices, may be eliminated. If the apparatus of FIG. 1 is operative to substantially reduce the jacket formed on the wire to a thin coating along selected portions thereof which define where the continuously formed wire will be cut to length for final use, then the post operations of stripping the wire will be substantially simplified and a substantial amount of insulating material which is normally scrapped, will have been saved.

The apparatus 10 comprises an extrusion machine 11 having an extrusion chamber 12 and means such as provided in said copending application Ser. No. 142,405 for controlling the feeding of extrusion material 17 through the chamber 12 and through the opening 14 of a die 13 disposed at the end of said chamber. Located within the chamber 12 are a plurality of pairs of powered feed rolls for an elongated member 18, one set of said feed rolls defined by notations 15 and 16 being illustrated in FIG. 1. The elongated member 18 is shown as a single rod or wire, although it may comprise a twisted or braided group of wires of copper or other metal, one or more metal strips or a performed metal tube.

Disposed against the front face of the die 13 and operative in accordance with the teachings of said parent application Ser. No. 142,405, are a pair of tools 20 and 20' for varying the thickness of the material coated onto the surface of the member 18 as the member is fed. In FIG. 1, portions 18' of the member 18 are shown bared of extrusion material, a condition which is effected by completely advancing blade-like parts 21 and 21' of the tools 20 and 20' across the face of the die opening to completely stop the flow of extrusion material onto the member 18 as it is fed. Each extrusion tool is composed of a blade-like member 21 connected to a shank 22 which may be the shaft of a lineal actuator 23 secured to the front face of the extruder or die. The lineal actuator 23 may comprise a hydraulic servo or motor operative to predeterminately project the blade 21 against or closely proximate to the surface of a member 18 and to retract same to completely clear the die opening 14. Each of the blades 21 is shaped with an edge 21' conforming to at least half of the surface of member 18 so that when both said blades are fully projected, they slidably engage the entire surface of member 18 and either completely stop the flow of extrusion material thereon or permit only the formation of a relatively thin coating of extrusion material along the surface of member 18 or the formation of a coating of reduced thickness, depending upon the degree the blades are projected by their respective servos. Simultaneously with the advancing of the blades 21, the screw, piston or accumulator means for feeding extrusion material to the chamber 12 may be slowed down or stopped in operation so as to not build up too much pressure within the extrusion chamber, although, in certain instances, where it is only necessary to slightly reduce or stop the flow of extrusion material for a short period of time, the extrusion screw or piston may be operated continuously.

Notation 18" refers to those portions of the length of member 18 which are coated or covered with extrusion material 17 disposed as a sheathing 17' thereon. In FIG. 3, the core member 18a is illustrated as a plurality of twisted wires such as conventionally used electrical conducting wire denoted 18a with portions 18a' thereof which are shown as having a thin coating 17" of extrusion material which has not been completely eliminated from the surface of the core formation 18a of the wires. However, the coating 17" is of such a thickness that, when the wire 18a is cut, preferably mid-way along the portion 18a', the substantially bared wire may be easily welded or soldered to with or without further removal of the thin coating therefrom.

In FIG. 4, a rod or wire 18 of metal such as copper, aluminum or other suitable material has short lengths 17a of plastic material extruded thereon by means of the apparatus of FIG. 1 and separated from each other as illustrated. The structure illustrated in FIG. 4 may serve a number of purposes and be utilized as a component of a number of different products. For example, further insulating sheet material such as plastic 19 may be spirally wrapped or otherwise disposed around and supported off the core member 18 by the portions 17a of extruded material to form an electrical cable or wire separated from its outer jacket or sheathing by annular air volumes. If the core member 18 comprises a tube or pipe, the provision of a jacket supported thereof by portions 17a of extruded material and formed by spiral wrapping or other means, may provide a conduit assembly which is insulated by the air volumes and trapped between the outer jacket and the pipe. If the core member 18 is a rope, cord, extruded flexible plastic filament or the like, the assembly illustrated in FIG. 4 may serve a number of other useful functions.

In FIG. 5 is shown a modified form of composite extrusion produced by the apparatus of FIG. 1 and comprising a central portion having a jacket or coating 17b separated by portions at the ends thereof which contain a light film or coating 17c of plastic material. By properly operating cooperating cutting blades B and B' associated with the apparatus of FIG. 1, the composite material of FIG. 5 may be severed along the portions containing coatings 17c and electrical connection or fastening thereto may be easily effected with the necessity of stripping larger diameter portions of the sheathing therefrom. If the core member 18 of FIG. 5 comprises a tube or pipe, its ends may be similarly bared or substantially bared of coating material to permit it to be flared and/or welded to other sections of pipe or tubing without the necessity of stripping substantially heavier coatings of jacketing, insulating material 17b therefrom.

The apparatus and structures illustrated in FIGS. 1–5 may be further modified to include means for forming the elongated core members 18 on a continuous basis and feeding same through the extrusion chamber 12 as illustrated. For example, the core member 18 may comprise a wire, rod or tube which is continuously extruded, cast or drawn to shape and fed through the extrusion chamber 12 and die 14 to have long or short sections of coating or jacketing provided thereon as illustrated in the other drawings. The core member 18 may also comprise a filament or filaments of reinforcing material such as a polymer, glass fiber, ceramic or other material which is either fed from a coil supply thereof or continuously formed and introduced into the chamber 12. In another form, the core member 18 may be extruded in the die 14 through a mandrel disposed therein and coated with short or long sections of jacketing material in the manner defined in FIG. 1.

A structure somewhat like that illustrated in FIG. 4 may be provided with the core 18 composed of a thread, monofilament for the same material of which the portions 17a are composed to be used, for example, as a line for hanging and holding objects such as clothing or, if 18 is made of a flexible thread-like or extruded filament, the portion 17a may be provided to serve as scouring or cleansing elements in a variety of medical, dental or cleaning products.

Figure 6:
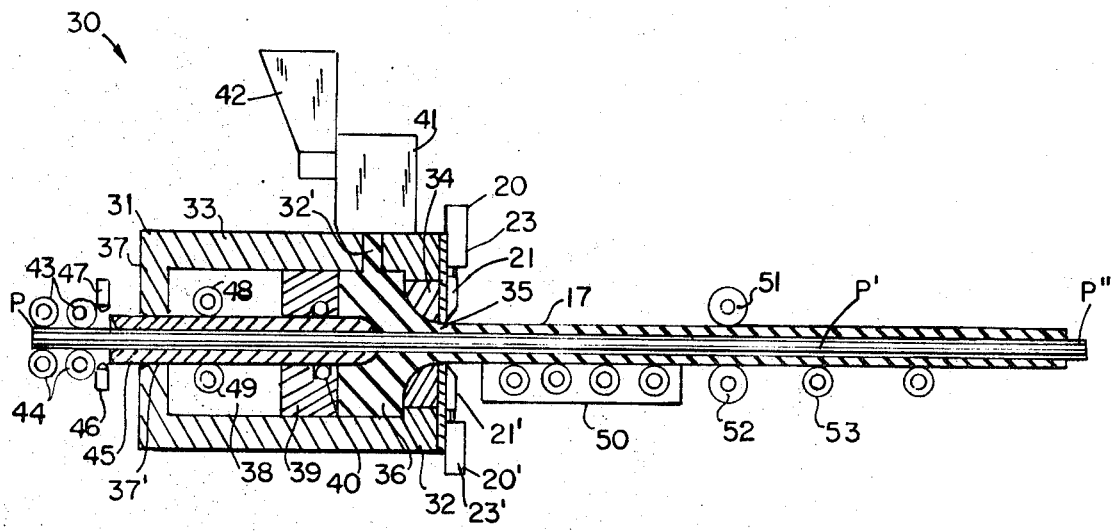
FIG. 6 is a side view of a modified form of the apparatus shown in FIG. 1 and operative to coat sections of elongated rod, wire or tubing.

In FIG. 6 is shown a modified form of extrusion coating apparatus 30 which is operative to permit the predetermined coating of short or long lengths of wire, rod, tubing, structural shapes or other members which are preferably preformed and individually fed to the coating apparatus. In particular, the apparatus of FIG. 6 employs a mandrel through which the elongated member to be coated is passed through an extrusion die, the mandrel being operative by longitudinal movement to either permit the coating of the extrusion or to block the annular opening in the extrusion die between the member being coated and the die wall to prevent or reduce the flow of extrusion material through the die.

Figure 7:
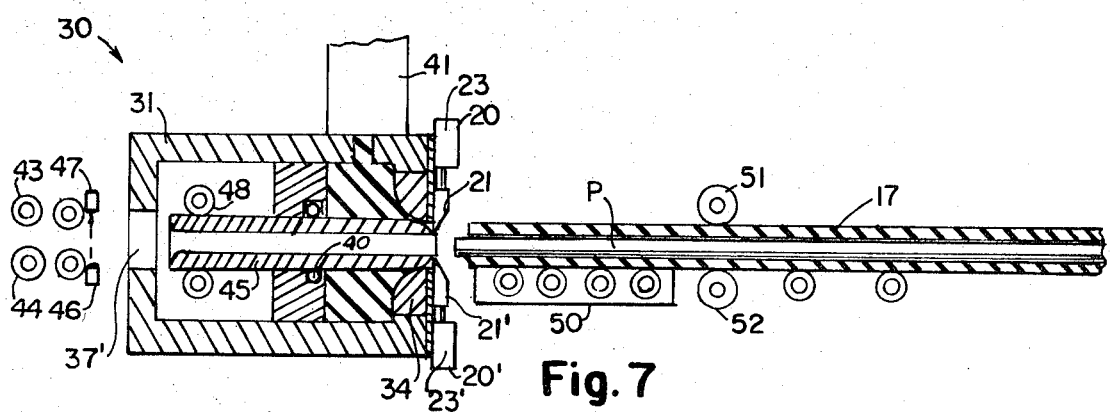
FIG. 7 shows the apparatus of FIG. 6 in the operative mode immediately after a section of tube or rod has been coated thereby.

In FIG. 6, an elongated member P is shown being coated by the modified form of extrusion apparatus 30 while FIG. 7 shows the member P just as the coating thereof has been completed. The apparatus 30 comprises an extruder 31 having a side wall 32 defining an extrusion chamber 36 into which extrusion material 17 is controllably fed from a pressurizing or feeding device 41 having its output connected to a passageway 32' in the wall 32 of the extruder. Notation 42 refers to a hopper or other source of extrusion material such as the described thermoplastic polymers which are fed to the device 41 which may contain an extrusion screw or piston or accumulator and pump operative to feed a predetermined quantity of extrusion material to the chamber 36.

The extruder 31 has a rear wall portion 33 defining a chamber 38 which is free of extrusion material and which is separated from the chamber 36 by means of a partition 39 having an opening therethrough in which a mandrel 45 is disposed and is movable therethrough back and forth in the extrusion chamber 36 from a retracted position such as that illustrated in FIG. 6 to an advanced position as shown in FIG. 7 whereby the forward end of the mandrel 45 is sealingly engaged by the tapered rear wall of the extrusion die 34 to prevent extrusion material from flowing from the chamber 36 outwardly through the die volume surrounding the elongated member P.

The elongated member P may comprise a preformed section of tube, pipe, rod or wire, say 5 feet to 50 feet in length and preferably in the range of 15–30 feet, the length of most commonly used sections of industrial or commercial type. The plastic material 17 comprising the coating for the pipe may comprise any suitable polymer such as polyethylene, polypropylene, polyurethane, polyamides, or the like which may be coated per se and solidified in situ on the exterior surface of the pipe or may be coated as an expanding or expanded cellular plastic material for insulating and protecting said pipe. The coating 17 may also comprise a plurality of extrusion materials each disposed as a different concentric layer around the pipe by means of an apparatus of more complex configuration than that illustrated in the drawing. Said coating material 17 may also comprise suitable ceramic materials disposed either in a cold or heated condition and solidified or cured on the outside surface of the pipe. The pipe or tube T may comprise a lining of relatively thin or heavier wall thickness for the composite article formed by means of the apparatus shown.

In operation of the apparatus 30, a length of rod or pipe P is first fed to a plurality of powered rollers 43–44 disposed beyond the rear wall 37 of the extruder 31 and so aligned as to feed the member 30 to the inside bore of the mandrel 45 which mandrel extends, in its retracted position as shown in FIG. 6, through an opening 37' in said rear wall 37. Disposed adjacent the rear wall 37 of the extrusion chamber is a light source 47 and photoelectric relay 46 operative to receive light from said light source when there is no section of the member P in alignment therewith. When the leading end of member P is driven through the path or field of the light source 47, it interrupts same cutting off light to the photoelectric cell of the photoelectric relay 46 which generates a first control signal a delay period thereafter which is determined by the operation of the motors driving feed rollers 43, 44 for the member P, said control signal being eventually operative to effect the retraction of the mandrel 46 to the position illustrated in FIG. 6 from the position shown in FIG. 7 so as to permit extrusion material fed into the chamber 36 to flow through the annular opening 35 in the die 34 against the leading end of member P and to continue to coat said member in a predetermined manner until the rear end thereof has been driven past the field of the light source 47 and photoelectric cell and relay 46. When the member P has been so driven, light from the light source 47 is passed to the photoelectric relay in 46 and in so doing, the control therefore is operative to generate a second signal which again operates a delay relay which controls a motor (not shown) operating a toothed wheel 48 which drives a spur gear (not shown) formed in or attached to the surface of the mandrel 45, thereby driving the mandrel against the rear face of the die opening as shown in FIG. 7 and cutting off extrusion material at a time just as or shortly before the rear end of member P exits from or approaches the front face of said extrusion die 34. While the motor driving the piston or screw in the extrusion feed apparatus 41 may be stopped or reversed in its operation at a time when the member P approaches or passes from the opening 35 in die 34, unless said opening is stopped or closed off by longitudinal forward movement of the mandrel 45, extrusion material will flow from the die after the rear end of member P has passed beyond the end of the die and will either overhang the end of member P or otherwise flow from the die. Since this condition is unwanted, either or both of the described stop extrusion means may be employed to effect the cut-off of coating material at the proper instant in a coating cycle. In other words, exterior tooling 20 and 20' of the type hereinbefore described is also provided mounted against the front wall of the apparatus 30 and includes respective upper and lower blades 21 and 21' which may be driven across the opening in the extrusion die to form a clean-cut and stoppage of the extrusion material around the member P at either the end thereof or a short distance from the end thereof such as that containing threads or required to permit the welding of member P to a coupling or another section of pipe or rod so coated.

To prevent the back flow of extrusion material, a circular seal 40 such as a metal O-ring is provided in a channel in the inside wall of the opening through partition 39 which provides bearing support for mandrel 45. The coated composite member B', upon exiting from the extruder 31 is fed onto a powered conveyor 50 and then between powered drive rollers 51 and 52 which engage opposite faces of the coating preferably after it has fully solidified and serve to draw said composite member away from and out of the extrusion chamber after the core member P has passed from between the rear drive rollers 43 and 44. Further powered rollers 53 are disposed downstream of the drive rollers 51 and 52 for conveying the composite member B' completely away from the apparatus 30. Notation P" refers to the end portion or portions of the core member P, one end of which is shown uncoated in FIG. 6 for the purpose described above.

In a preferred form of the invention, the motor means for power operating rollers 43, 44, 48, 49, 52 and the conveyor means 50, 53 may be constantly operated to drive said rollers at constant speed or may be operated in response to the operation of a start switch which may comprise a limit switch disposed adjacent the first set of powered rollers 43, 44 which limit switch may also be operative to trigger a complete coating cycle for one length of pipe as described. If it is known how long it will take to drive the leading edge of the rod or pipe P to that relative position with respect to the extrusion die 34 where coating is to be initiated and how long it will take the trailing or rear end of member P to travel from the time its presence is detected by means of a limit switch or the photoelectric relay 46 to the position with respect to the die 34 where the coating is to be terminated, then suitable electronic time-delay relay means may be connected to the output of the detection relay or limit switch 46 for predeterminately controlling the operation of the motors driving powered rolls 48, 49 and the means associated with feed device 41 for forcing material into extrusion chamber 36 as well as the solenoid or motor means 23 and 23' effecting advancement and retraction of the exterior tooling blades 21 and 21' so that proper and predetermined coating of a member such as P may be automatically effected each time such a member is fed to the input end of the extrusion-coating apparatus defined by the powered drive rolls 43, 44 by utilizing such time-delay relay control means, pipes, rods or wires of the same diameter and external shape, but of different length, may be automatically and predeterminately coated, assuming that the start and stop controls of each of said motors as well as the speed controls thereof may be predeterminately regulated so as to essentially conform with the described time delays. However, multicircuit computerized control means employing feedback signals as provided in my said copending application may also be utilized to effect the coating of the same lengths of wire or pipe by programming the described drive and material feed operations.

Figure 8:
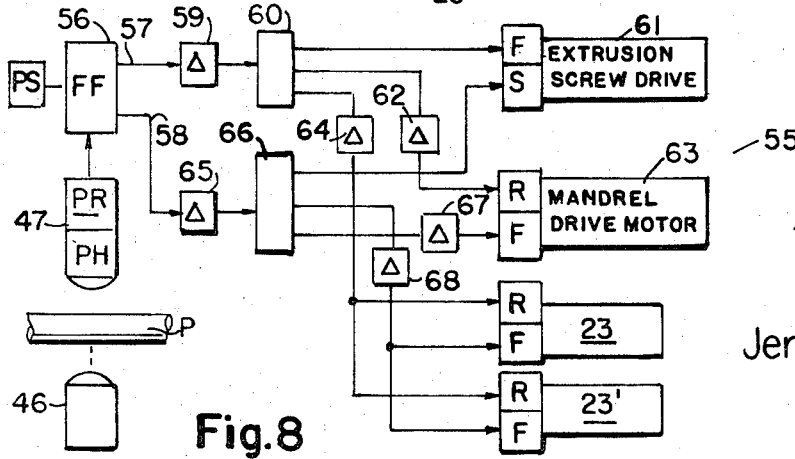
FIG. 8 is a schematic diagram showing a control system for automatically controlling the apparatus of FIGS. 6 and 7.

FIG. 8 illustrates automatic control means for controlling a coating operation utilizing an apparatus of the type provided in FIGS. 6 and 7 for predeterminately coating any length of pipe of the same diameter. The core member of pipe P is shown interrupting light from the light source 46 to a photoelectric cell PH forming part of the photoelectric detector 47. The photoelectric cell PH has its output connected to a relay circuit PR of conventional design which is operative to generate an output signal whenever light from the light source 46 is interrupted by the core member P as it is driven between powered rollers 43, 44 into the extrusion chamber through rear wall opening 37' therein. The output of the photoelectric detector 47 is passed to a bi-stable flip-flop switch 56 which, when the signal generated by PR is present on its switching input, passes a source of electrical energy from the power supply PS on a first output circuit 57 to a time-delay relay 59 which is connected to a pulse transformer 60. At a predetermined time after its input is energized, the time-delay relay 59 passes a signal to the pulse transformer 60 which has a plurality of outputs, one of which extends to the forward drive control F of the extrusion screw drive motor 61 for feeding extrusion material to the chamber 36. If the extrusion material is a thermoplastic material, suitable heating means is provided in the walls 32 of the extrusion chamber to maintain the extrusion material therein in a molten condition. The extrusion screw drive motor 61 is preferably started just as the forward end of the member P has entered or is passing from the extrusion die 34, depending on at what point along the forward end of member P the coating of extrusion material is desired to be initiated. In other words, the time-delay relay 59 is of such a nature that suitable coating of extrusion material will initiate along that portion of the member P from the end of said member in which coating is desired leaving, for example, a portion P" which is either free of extrusion material or contains a thin coating thereof over the end threads of the pipe or that portion which is desired to be welded, flared or otherwise secured to an end fitting or other section of pipe. A second output of the pulse transformer 60 is passed to a time-delay relay 62 which generates a signal or energizing the reverse drive control R for the mandrel drive motor 63 retracting the mandrel 45 a sufficient distance into the extrusion chamber 36 to permit extrusion material to flow outwardly through the die and surround the core member P. The time-delay relay 62 is of sufficient duration to permit the build-up of the proper pressure in the extrusion material located in the extrusion chamber 36, although it is noted that depending on how the extrusion screw or pressurizing device located in the heat device 41 had been operated during the previous cycle. A further output of the pulse transformer 60 is passed to a time delay-relay 64 the output of which is passed to the reverse controls R of the servos 23 and 23' controlling withdrawal of the blades 21 and 21' from across the extrusion die opening 35 at the proper instant to effect the desired type of initiation of the coating operation (i.e.—whether a portion of the heating end of the pipe such as P" should be rendered uncoated and to what degree).

After the mandrel 45 has been retracted to the position illustrated in FIG. 6 and the external tooling servos 23 and 23' have been operated to retract the external tools 21 and 21', uniform coating of the core member P continues until the trailing end thereof enters or passes from the opening 35 in the extrusion die 34. The action of emanating the coating operation at the proper instant is initiated when the trailing end of the core member P passes out of the field of light from source 46 limiting light therefrom to enter the photoelectric cell PH of the photoelectric control unit 47 whereupon the output thereof to the control switch 56 terminates, causing power from the power supply PS to be switched to the second output 58 of said switch which extends to a time-delay relay 65 having its output extending to a second pulse transformer 66. One output of the pulse transformer 66 extends either to the stop control S of the extrusion screw drive motor 61 terminating the flow of extrusion material into the chamber 36 or to a suitable cycle controller (not shown) which operates the extrusion screw drive motor in a manner to either reduce pressure on the extrusion material in the chamber by reverse driving said motor or to withdraw extrusion material from said chamber. Another output of the pulse transformer 66 extends to a time-delay relay 67 which energizes the forward drive control F of mandrel drive motor 63 to drive the mandrel 45 into and against the wall of the extrusion die 34 to shut off the flow of extrusion material through the die opening 35 at the proper instant to terminate coating. The motor 63 is operative to automatically stop when the forward end of mandrel 45 sealingly engages the wall of the opening 35 in the die 34, said motor stoppage being effected by, for example, a pressure switch (not shown) operating off the output of said drive motor and connected to the stop control for said motor. A further output of pulse transformer 66 is passed to a further time-delay relay 68 having outputs extending to the forward drive controls F for the lineal actuator solenoids or servos 23 and 23' which cause the blades or tools 21 and 21' of external tooling 20 and 20' to advance towards the member P and suitably cut through or terminate the flow of extrusion coating material 17 onto member P either at the trailing end thereof or a predetermined distance prior to the end of the core member such as that containing coupling threads or a portion of the core member required to be otherwise fastened to other similar members or devices. For example, FIG. 7 illustrates a portion of the trailing end of core member P free of extrusion material 17 as provided by the timed advancement of the tooling blades 21 and 21' thereagainst.

It is also to be noted that by properly timing the operation of the mandrel 45 to cut off and permit the flow of extrusion material and the operation of the means feeding material into the chamber 36 and, in certain instances, the operation of the external tooling 20 and 20', coatings which vary in external shape such as any of those hereinabove described and described in my said parent application may also be provided by means of the apparatus of FIGS. 6 and 7. While either or both the means shown in FIGS. 6 and 7 for stopping the flow of extrusion material through or from the die onto the core member may be employed, it is to be noted that the mandrel may also be shaped to vary the wall thickness of the coating along the length of the core member from a relatively thin coating such as one provided over threaded end portions of pipe P which would permit threadable connection and sealing of said pipe to couplings and other lengths of pipe to a substantially thicker coating. In certain instances, the apparatus of FIGS. 6 and 7 employing a mandrel 45 for cutting off the ow of extrusion material may be necessarily applied to apparatus of the type shown in FIG. 1 to prevent the flow of extrusion material through the die when the end of the member being coated has passed through said die.

It is also to be noted that the member P may also be formed by means of a second extruder located beyond the rear wall 37 of the extrusion chamber and fed through the mandrel 45 on a continuous basis to form a composite extrusion of two plastics, a metal pipe or core member and a plastic or ceramic coating thereon or other materials. Thus, composite pipe made of a metal core having a plastic coating may be formed on a continuous basis since the extruder or continuous casting machine forming the core portion P of a composite pipe may be located sufficiently upstream of the coating extruder 31 to permit sufficient cooling of the metal so that it may be properly coated with a polymer which melts or degrades at a substantially lower temperature than that at which the pipe or core is extruded or continuously cast. Cooling means, of course, may be provided between the two extruders and may also be provided downstream of the extruder 31 to properly cool the core member and coating material.

The apparatus of FIGS. 6 to 8 may also be modified to simultaneously internally and externally coat tube or pipe sections with plastic or other materials for protecting same against corrosion and insulating same. For example, an elongated tube having an outside diameter smaller than the inside diameter of the pipe section P may be axially aligned with the mandrel 45 so that the pipe section passed thru said mandrel will pass over said elongated tube as it is driven along powered conveyor 50. Coating material injected through said elongated tube into the annular volume therebetween and the inside wall of the pipe to be coated may be deposited onto said inside wall as it is driven over the elongated tube, and solidified in situ thereon. Said coating material may be sprayed from the end of its tube as a liquid or particulate plastic. If the coating material is a thermoplastic powder such as polyethylene, it may be caused to melt and fuse against the inside wall of pipe P by either preheating said pipe prior to its insertion into the opening 37' in extruder 31 or by the heat applied to said pipe as it passes through the extrusion material in the chamber. If the walls of pipe P are heated above the melting point of the particulate thermoplastic coating material, said powdered plastic may be fluidized upon leaving their tube or conduit by supplying same with suitable air or gas flowed thru the tube. For this particular operation of coating the interior of a pipe, the apparatus 30 may be disposed to drive the pipe P vertically to generate a vertical fluidizing gas column at the end of said injection tube within pipe P. After coating the pipe length, the injection tube may be removed therefrom.

FIGS. 9 and 10 illustrate a modified form of the invention in which a first material 73 is extruded to the shape of a tube 73' formed over a mandrel 76 disposed within the opening 75 of an extrusion die 74 and a second material 78 is caused to flow against and coat the inside of the tubular extrusion 73'. This operation may be combined with the above-described external coating operation to coat both the inside and outside surfaces of a tube which is either continuously formed by means of the extrusion apparatus 70 or is a preformed section of tube which is fed to an extrusion coating apparatus of the type previously described and illustrated in FIGS. 6 and 7, for example.

The internal coating operation illustrated in FIG. 9 may also be utilized to coat just the inside of either a continuously formed extrusion or a preformed tubular member fed over a mandrel.

In FIG. 9, extrusion material 73 is fed to an extrusion chamber 71 by suitable screw or piston means as described herein and is forced through the die 74 and over the mandrel 75 to form a tubular shape 73'. In FIG. 9, the mandrel 76 is shown extending just through the die opening, although its end portion 76' may extend just to the face of the die or well downstream thereof as illustrated in FIG. 10 to permit suitable coating of the extrusion.

Coating material is introduced against the inside surface 73a of the pipe or extrusion 73' through a passageway 77 extending longitudinally through the mandrel. The passageway 77 is connected at one end (not shown) to a source of coating material 78 and to means for predeterminately pressurizing same to cause it to flow to the opening 77 at the downstream end of the passageway 76. Said downstream end of the mandrel and passageway therein may be suitably shaped to permit either the stream flow or spray of coating material from the end of the mandrel against the inside surface 73a of the member 73 and the flow of coating material may be regulated in accordance with the rate of flow or travel of the tubular member 73' from the extrusion apparatus 70.

The coating 79 formed on the inside surface 73a may be applied to the member in a number of manners, depending on the material comprising said coating and the temperature of the material of the tubular member in the area where the coating material is applied. For example, the coating material 78 may be applied as a molten polymer which is either spray or stream flowed radially outwardly in a conical formation 78' from the end of the mandrel as illustrated in FIG. 9 at a substantially constant rate of flow while the tubular formation 73' passes from the apparatus 70 at a substantially constant speed, thereby assuring a substantially constant layer of coating material against the inside surface 73a of member 73'. The coating material introduced through passageway 77 may also comprise a particulate thermoplastic or other suitable coating material introduced on an inert gas stream or caused to flow in a liquid solution or bonding agent and sprayed or conically flowed against the inside surface of the tube as illustrated. Bonding of the coating material to the inside surface of the tube may be effected by fusion of molten polymer or particles when the coating material and/or the extrusion material 73 cool and solidify.

While the extrusion material 73 is preferably a thermoplastic or thermosetting polymer in the apparatus of FIG. 7, it may also comprise certain cold or hot setting ceramic materials, metal or other materials, depending on the characteristics of the coating material. If the temperature of the extrusion 73' as it exits from the extruder 71 is so high as to volatize, deteriorate or destroy the coating material if introduced against the extrusion in the vicinity of the extruder, the extrusion may be sufficiently lowered in temperature beyond the die prior to applying the coating material to permit properly coating the inside surface of the extrusion. In FIG. 10 is shown a modified form of the apparatus of FIG. 9 for coating the inside surface of a tubular extrusion on a continuous basis by applying a coating material thereto through a mandrel which extends for a sufficient distance beyond the extruder, as illustrated, to permit proper and suitable cooling of the extrusion either in the air or by means of auxiliary cooling means brought into operation between the extruder and the portion of the extrusion being coated. Accordingly, the apparatus 70' includes an extrusion chamber 71' having a die 75' with an opening 76' therein through which opening an elongated mandrel 80 extends a substantial distance beyond the extruder such that the extrusion 85 may be properly cooled within said distance to a temperature such that it may be properly internally coated without degrading, volatizing or otherwise destroying the coating material. The extrusion material, for example, may comprise a metal such as steel, aluminum or other non-ferrous metal or a ceramic or polymeric material which is extruded at a substantially higher temperature than the melting point of the coating material. Aluminum, for example, is generally extruded from a heated slug of metal in the range of 1000° to 1100° F. which is substantially above the temperature at which many polymers will char or vaporize. Accordingly, if it is desired to coat the inside surface of an aluminum tube during the same operation in which it is extruded with a polymer such as polyethylene, polyurethane, polyamide, polytetrafluorethylene or other relatively low temperature polymer which will degrade or char at said extrusion temperature, said polymer may not be applied to the extrusion until it has reached a temperature in the range of the melting point of the polymer or perhaps lower and the mandrel 80 of FIG. 10 is of such a length that when the coating material 78 is flowed through the interior passageway 81 of the mandrel and outwardly from the end thereof against the interior surface of the tubular extrusion 85 by direct flow or spray flow of the type described, it may be deposited to form a relatively uniform layer such as a tubular coating on the inside surface of the extrusion without burning or degradation.

Deposed beyond the end of the extrusion chamber 71' is a cooling chamber 86 containing powered rollers 87 which receive and guide the extrusion through the chamber and a plurality of fluid spray nozzles 88 operative to spray or flow a suitable heat transfer liquid against the extrusion at such a rate and for a sufficient distance to cool the extrusion to a temperature in the range of or below the melting point of the coating material or that required to effect suitable coating by the time the extrusion has left the cooling chamber 86. The mandrel 80 therefore extends to the end of or beyond the cooling chamber 86 and the temperature of the end portion of the extrusion aligned with the end of the mandrel is preferably such that the most effective coating operation will be realized. For example, if the coating material is a powdered polymer introduced through the passageway 81 in the mandrel at a substantially constant rate then the temperature of that portion of the extrusion which is aligned with the end of the mandrel is preferably just above the melting point of the polymer so that particles of polymer flowed from the nozzle or multiple holes 81' at the end of the mandrel will melt and form a coating on the inside wall of the extrusion on a continuous basis. Of course, if the material flowed over the mandrel and against the inside surface of the extrusion is such that it will suitably bond to the extrusion at a higher temperature the length of the cooling chamber 86 and the operation thereof are preferably controlled to provide said extrusion aligned with the end of the mandrel at said proper temperature.

It is to be noted that while extrusion rate-of-flow and the operation of the heat transfer means may be preset to permit the continuous production of interiorly and exteriorly coated tubing as described, feedback systems employing means for detecting the temperature of that portion of the extrusion which first receives coating material may be employed to generate signals which may be used to control the process variables to maintain the desired temperature at the portion of this extrusion being coated. Accordingly, one or more temperature-sensing transducers may be disposed along the extrusion line to sense variations in the temperature of the extrusion and provide feedback signals operative to increase or decease the other variables decribed in a manner so as to maintain the temperature of the extrusion at the coating location subsantially constant and predetermined.

Depending on the extrusion materials employed in the apparatus hereinbefore described, it may be desirable to either constantly or program control the heating of the described extrusion mandrels and dies either to provide suitable means for maintaining the flow of extrusion material in a molten condition, for example, after the flow has been stopped by one or more of the means described or to properly treat or set the extrusion material and/or the material applied to coat the inside surface thereof. Accordingly, suitable combustion or electrical resistance heating means may be provided inside the mandrel.

The mandrel 80 of the extrusion apparatus of FIG. 10 is shown as having a reduced diameter end portion 80' protruding a substantial distance from the end of the portion of the mandrel employed to shape the tube 85 in the extrusion die thus providing an annular volume 90 between the tube and mandrel into which volume a further coolant such as a gas may be flowed from passageways in the mandrel (not shown) and out of orifices 89 disposed about the mandrel end portion 80' as shown so as to provide further means for cooling the extrusion in cooperation with the cool and liquid ejected from the spray nozzles 88 disposed in the chamber 86.

While the apparatus of FIGS. 9 and 10 shows means associated with the mandrel for spraying coating material inside the extrusions to form the coatings 79 and 79' respectively covering the inside surfaces of the extrusions 73' and 85, it is to be noted that by properly shaping and disposing the end portions of said mandrels, coating material may be directly flowed against the inside surfaces of the extrusions from one or more openings in the mandrel extending into the tubular extrusions formed over said mandrel.

If the coating material is a monomer, it may be polymerized in situ against the inside wall of the extrusion by the heat of the extrusion and/or by a suitable radiant energy generating means such as an electron gun, laser, corona discharge means, microwave generating means or ultrasonic transducer mounted in the mandrel and disposed so as to properly direct radiant energy against the coating material as and/or immediately after it is deposited against the inside surface of the extrusion formed over the mandrel. These or other forms of radiant energy may be employed at one or more suitable locations in the mandrel to properly treat, cure or bond the coating material to the extrusion. Flame spraying, so called sputter discharge coating or other means may be mounted at the end of the mandrel to effect coating or treatmeant of the coating material and/or the inside surface of the extrusion. Vibrating the mandrel such as by means of an ultrasonic transducer mounted therein or coupled thereto or by other means may also be employed to (a) facilitate the flow of extrusion material thereover, (b) improve the internal structure of the extrusion material, (c) cure or improve the physical characteristics of the coating material, (d) improve or effect a suitable bond between the coating material and the surface of the extrusion against which it is being flowered or sprayed, (e) effect suitable atomization of the coating material flowing from the end of the mandrel per se or in combination of said improved functions. Ultrasonic vibration or any of the aforementioned transducing means supported by the mandrel may also be employed to roughen or otherwise shape the inside surface of the tubular extrusions to affect the flow of gas or liquids flowed through the extrusion such as by reducing boundary layer effects, generating turbulence in said gas or liquid flowed therethrough or improving the transfer of heat between the fluid and the walls of the extrusion when later used in a fluid conducting system.

It is also noted that extrusion apparatus of the type hereinbefore described may also be utilized to extrusion form or coat pipe, tubing, rod or other apparatus as described with a thermosetting resin requiring heat or radiation to cure same. Accordingly, suitable radiant energy generating means may be mounted within the die end or mandrel of the extrusion apparatus described for generating sufficient heat or other form of radiant energy to effect the curing of the thermosetting resin applied as a coating to the outside and/or inside surface of the extrusion or preformed member so coated.

The coating material is dispensed from the ends of the mandrels of FIGS. 9 and 10 may also comprise molten or flame-sprayed metal, polymers, ceramics or other materials which, in certain instances, may contain reinforcing elements such as fibers of filaments applied therewith to the surfaces described.

I claim:
1. An extrusion apparatus comprising:
 (a) an extrusion chamber including a die having an opening for shaping extrusion material,
 (b) means for driving a preformed elongated member having a cross-section which is smaller than the cross-section of that portion of the opening in said die in which extrusion material is formed to shape,
 (c) means for expressing extrusion material through the opening in said die while said elongated member passes through said die to deposit and form a coating of said extrusion material on said elongated member as it is fed, and
 (d) reciprocating tool means operable for varying the expression of extrusion material through said die by reducing the die opening, and means for operating said tool means when said elongated member has travelled a predetermined distance through said die to vary the amount of extrusion material disposed against said elongated member.

2. An extrusion apparatus in accordance with claim 1, whereby said elongated member is substantially cylindrical in external shape and said die opening is substantially circular in cross section, means for guiding said elongated member substantially through the center of said die opening, whereby a cylindrical jacket of said extrusion material is deposited completely about said elongated member and means for stopping the flow of extrusion material through said opening when predetermined portions of said elongated members have been driven predetermined distances through said die.

3. An extrusion apparatus in accordance with claim 1, including means for intermittently operating said means stopping the flow of extrusion material through said die to intermittently interrupt the flow of extrusion material onto said elongated member and provide similarly shaped portions of said extrusion material at predetermined locations along the length thereof.

4. An apparatus in accordance with claim 3, whereby said elongated member comprises an electrical conductor such as a wire or cable and said extrusion material is an insulating material, said means stopping the flow of extrusion material being operative to substantially bare portions of the surface of said conductor as it is fed to permit electrical connection thereto without the need for the post stripping of insulating material from said conductor.

5. An apparatus in accordance with claim 4, including a cutting means operative to sever portions of the elongated member after it has passed through said die, and means for controlling the operations of said cutting to sever said elongated member along those portions thereof which are substantially bared of said extrusion material.

6. An apparatus in accordance with claim 1, said means for stopping the flow of extrusion material through said die including a mandrel located within said extrusion chamber, said mandrel having a forward end portion shaped to conform to the wall of said die surrounding the opening therethrough so as to substantially block said opening when abutting said wall, means for guiding said mandrel from a retracted position within said chamber to a position engaging said wall of said die to block the flow of extrusion material therethrough, reversible power means for causing said mandrel to assume both said retracted position and said position engaging said die and means for controlling said power means to retract said mandrel from engagement with said die to permit extrusion material to flow through said die when said elongated member is in a first predetermined position with respect to said die and to advance to stop the flow of extrusion material through said die when said elongated member is in a second predetermined position with respect to said die.

7. An apparatus in accordance with claim 6, said mandrel having a passageway extending longitudinally therethrough, means for feeding said elongated member through said passageway and through the opening in said die to effect the extrusion coating of said elongated member with extrusion material.

8. An apparatus in accordance with claim 7, said extrusion chamber having an opening therein and means for guiding and feeding short lengths of said elongated member through the opening in said extrusion chamber and through the passageway through said mandrel and therefrom through said die opening.

9. An apparatus in accordance with claim 8, including means for driving said mandrel through said opening in said chamber and means for guiding and driving lengths of elongated members through said mandrel and out of the forward end of said mandrel through the die opening.

10. An apparatus in accordance with claim 8, including detection means for a length of elongated member fed through said chamber and control means for controlling said power means to control movement of said mandrel and said means for expressing extrusion material, said control means being operatively connected to said detection means whereby the activation of said detection means upon detecting a length of said elongated member fed to said apparatus will be operative in effecting the retraction of said mandrel to remove the forward end thereof from engagement with said die wall to permit the flow of extrusion material through said die and the operation of said means for expressing extrusion material to cause the flow of extrusion material onto said elongated member when said elongated member is predeterminately located with respect to said die.

11. An apparatus in accordance with claim 10, whereby said elongated member is a section of tubing or pipe, said control means being operative to effect the coating of the central portion of said pipe while maintaining the end portions thereof substantially bare of coating material to permit fastening of said end portions.

12. An apparatus in accordance with claim 10, whereby said control means is operative to effect the coating of the center portion of said elongated member with a covering of extrusion material of substantially constant cross section and to effect the coating of end portions thereof with extrusion material of substantially reduced thickness in the order or .001" to .010" thick.

13. An apparatus in accordance with claim 8, including a metal extrusion press located upstream of said extrusion chamber and operative to form said elongated member in the shape of a tube or pipe, means for cooling said pipe before it enters said extrusion chamber to a temperature whereby it will not degrade said extrusion material whereby substantially long lengths of said pipe may be formed and coated with said extrusion material.

14. An extrusion apparatus in accordance with claim 1, wherein said varying means is operative to substantially stop the flow of extrusion material through the opening in said die.

References Cited

UNITED STATES PATENTS

| | | | |
|---|---|---|---|
| 1,876,256 | 9/1932 | Maynard | 18—14(I) |
| 2,731,069 | 1/1956 | Horn | 18—13NUX |
| 3,176,494 | 4/1965 | Cullen et al. | 18—14VUX |
| 3,387,069 | 6/1968 | Stohr | 18—14VUX |

H. A. KILBY, JR., Primary Examiner

U.S. Cl. X.R.

18—14